Sept. 27, 1966 H. J. KUNZ 3,275,912
MICROELECTRONIC CHOPPER CIRCUIT HAVING
SYMMETRICAL BASE CURRENT FEED
Filed Dec. 17, 1963

INVENTOR.
HANS J. KUNZ
BY
Robert J. Haase
ATTORNEY

United States Patent Office 3,275,912

Patented Sept. 27, 1966

3,275,912

MICROELECTRONIC CHOPPER CIRCUIT HAVING SYMMETRICAL BASE CURRENT FEED

Hans J. Kunz, Raleigh, N.C., assignor to Sperry Rand Corporation, Great Neck, N.Y., a corporation of Delaware Filed Dec. 17, 1963, Ser. No. 331,164
5 Claims. (Cl. 317—235)

The present invention generally relates to microelectronic chopper circuits and, more particularly, to a circuit of that type provided with a special base ohmic contact for minimizing circuit asymmetry.

There are many applications in the electronic instrumentation art for a circuit component having characteristics approaching those of a perfect switch. In satisfactorily fulfilling such applications, the component must exhibit substantially zero voltage when in a conducting state, a substantially infinite impedance when in the non-conductive state, and the ability to maintain the aforesaid characteristics under severe environmental conditions. Mechanical contact modulators or "choppers" have been used extensively in the past. However, the more recent need for choppers operating at very high switching rates has engendered the development of all-electronic or transistorized equivalents.

A disadvantage of the transistorized circuit is the fact that a transistor acts as a voltage source when placed in a state of saturation current conduction. Unlike a closed mechanical switch, a conducting transistor generates a small potential known as the "off-set" potential acting between the emitter and collector. The off-set potential problem has been minimized through the use of a pair of transistors having commonly connected emitters or commonly connected collectors in series circuit configuration whereby the off-set potential of one transistor opposes the off-set potential of the other transistor to minimize the net potential acting between the input and output terminals of the chopper circuit when the transistors are in a saturation current condition.

It has been proposed to fabricate the two transistors comprising the chopper circuit on the same semiconductor wafer so that the characteristics of the two transistors can be made as nearly identical as possible and in order that the two transistors be exposed to substantially the same environmental conditions. However, the extremely small dimensions of and distance between the individual transistors make it very difficult to maintain circuit symmetry. The symmetry of the microelectronic chopper circuit is a major factor in minimizing net off-set potential and in determining proper circuit operation.

It is the principal object of the present invention to provide a microelectronic chopper circuit characterized by symmetry for minimizing net off-set potential.

Another object is to provide a microelectronic chopper circuit adapted for symmetrical base current feed.

These and other objects of the present invention, as will appear from the reading of the following specification, are achieved in a typical embodiment by the provision of a pair of planar transistors formed on a single monolithic block of semiconductive material. The circuit is produced by conventional oxide masking and impurity diffusion steps resulting in a pair of transistors whose bases are directly connected together through the wafer and whose collectors are directly connected together through the wafer. The emitters of the two transistors are formed on the same surface of the wafer within an area which is common to the bases of both transistors. The common collector area of both transistors extends to both surfaces of the wafer.

Symmetrical base current feed to both transistors is facilitated through the use of a single base ohmic contact which completely surrounds the two emitters and includes a central portion passing between said two emitters. An extension or tab is connected to the central portion of the base ohmic contact. The tab, like the base contact itself, is deposited upon the surface of the wafer but is isolated from direct electrical contact with the wafer by a layer of insulating material. The base ohmic contact, on the other hand, is in direct electrical contact with the common surface region of the two transistors. The insulating layer allows the tab to be dimensioned and located to suit convenience in assembly without adversely affecting the electrical operation of the circuit. A feature of the base tab configuration is that external circuit connection can be made to the transistor base via the tab without requiring extreme precision in order to maintain base current feed symmetry.

For a more complete understanding of the present invention, reference should be had to the following specification and to the figure of which, FIG. 1 is a schematic representation of a transistorized circuit functionally similar to the microelectronic chopper circuit of the present invention;

Figure 1:
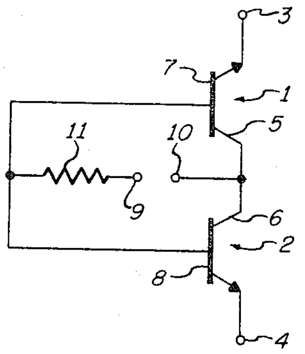

Referring to FIG. 1, transistors 1 and 2 comprise the active elements of an all-electronic switch for connecting terminal 3 to terminal 4 when the switch is in the closed condition and for disconnecting terminal 3 from terminal 4 when the switch is in the open condition. Although it is optional whether the emitters or collectors of transistors 1 and 2 are directly connected to each other, it is preferred that collector 5 of transistor 1 be directly connected to collector 6 of transistor 2 as shown in FIG. 1. Base 7 of transistor 1 is directly connected to base 8 of transistor 2. A switching signal for rendering transistors 1 and 2 conductive or non-conductive is applied between terminals 9 and 10. Terminal 10 is directly connected to collectors 5 and 6. Terminal 9 is connected to bases 7 and 8 via resistor 11.

When transistor 1 and transistor 2 are switched into a saturation collector current condition, a potential which is termed "off-set" potential is developed between the emitter and collector of each transistor. It has been found that when the switching potential is applied between the base and collector electrodes of each transistor, the off-set potential is reduced relative to that which would be produced if the collector and emitter of each transistor were interchanged, i.e., the emitters being directly connected to each other and the collectors being connected to terminals 3 and 4, respectively. Irrespective of which circuit configuration is employed, the off-set potentials developed between the emitter and collector electrodes of each transistor are in series circuit opposition from the point of view of output terminals 3 and 4. If each of the two transistors can be made substantially identical to each other and subjected to substantially identical environmental conditions, the off-set potentials tend to cancel each other leaving no net potential appearing between the switch terminals 3 and 4. The so-called "inverted" circuit configuration of FIG. 1 produces a minimum of net off-set potential acting between terminals 3 and 4 in the event that the two transistors are not identical in characteristics or not subjected to identical environmental conditions. It is largely for this reason that the inverted circuit configuration is preferred. It will be noted that in the inverted configuration, the electrodes which are nominally "collectors" actually act as emitters whereas the electrodes which are nominally "emitters" actually function as collectors.

Figure 2:
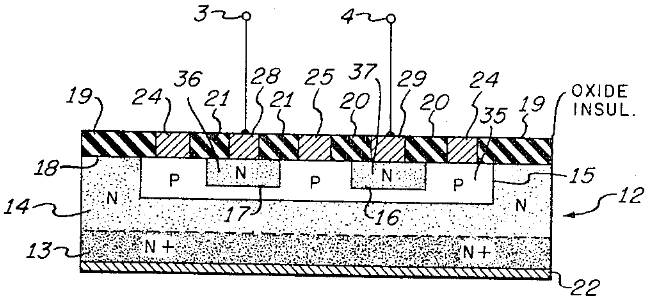
FIG. 2 is a cross-sectional view of a preferred embodiment of the present invention.
Figure 3:
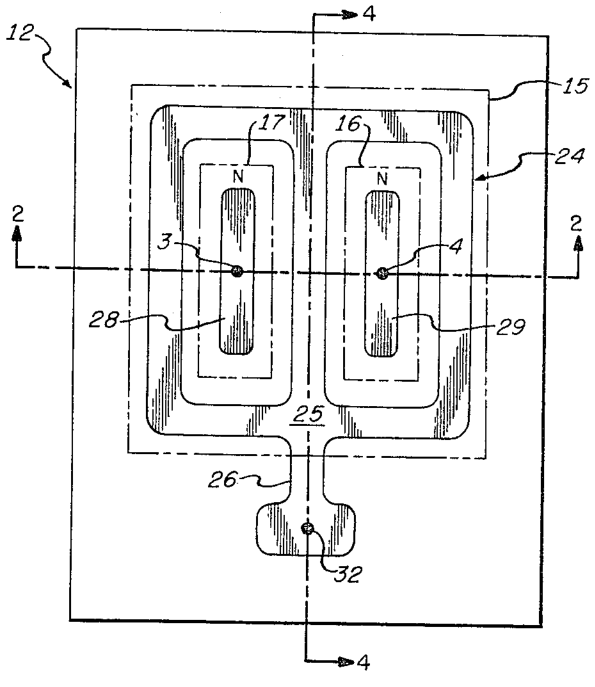
FIG. 3 is a plan view of the preferred embodiment.
Figure 4:
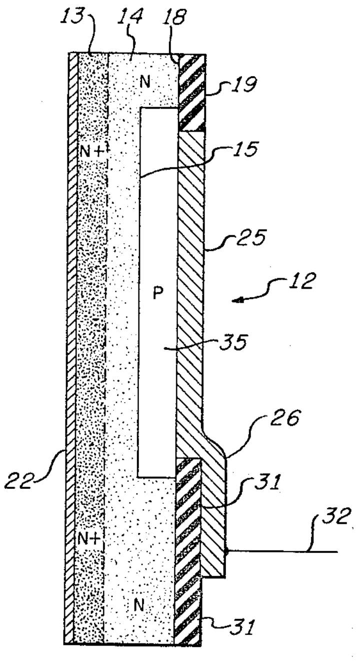
FIG. 4 is a second cross-sectional view of the preferred embodiment.

It has been proposed that the two transistors be fabricated on a single monolithic block of semiconductive material in order that the two transistors have substantially identical characteristics and be subjected to substantially the same environmental conditions. Such a microelectronic chopper circuit is represented by FIGS. 2, 3 and 4. The microelectronic circuit is fabricated on a single wafer 12 of semiconductive material such as silicon. Wafer 12 comprises a heavily N-doped substrate 13 and a N-doped epitaxial layer 14. By conventional oxide masking and impurity diffusion techniques, a single collector junction 15 and two emitter junctions 16 and 17 are produced in the wafer. Each of junctions 15, 16 and 17 extends to the surface 18 of wafer 12 but is protected from contamination by protective insulating layers 19, 20 and 21. The insulating material preferably is silicon dioxide which may be formed on the surface of the semiconductive wafer by exposure to steam or oxygen. The insulating layers are etched away from the surface of the wafer at areas at which ohmic contacts are to be deposited on the base and emitter regions. In the disclosed embodiment, a collector ohmic contact is provided by thin metallic layer 22 deposited on the exposed surface of substrate 13.

The dimensions of the semiconductive wafer and the dimensions separating the base region 35, emitter regions 36 and 37 and collector region 14 in the wafer have been exaggerated in the drawings for the sake of clarity. Actually, all of the dimensions are extremely small posing a difficult problem in the accurate establishment of external circuit connections to the base and emitter regions. This is especially true of the establishment of external circuit connection to the common base contact of the chopper circuit. If the base connection is not made symmetrically with respect to the two transistors, the symmetry of the circuit will be impaired with the result that minimum net off-set potential will not be achieved.

In accordance with the present invention, a special base ohmic contact is provided to eliminate the need for extreme accuracy in the making of external contact to the base regions. As shown more clearly in FIG. 3, the base ohmic contact 24 completely surrounds the two emitter junctions 16 and 17 and includes a central portion 25 passing between the two emitters. An extension or tab 26 is connected to the central portion of the base ohmic contact. It is convenient to fabricate the entire base ohmic contact configuration as one integral structural member such as aluminum which is deposited through openings etched in the silicon oxide layer or surface 18 of wafer 12. During the same operation, aluminum is also deposited in areas 28 and 29 to form emitter contacts through openings etched in the oxide layer. Thus, the aluminum members forming the base and emitter ohmic contacts are in direct electrical connection with the surface 18 of wafer 12. The elongated tab 26, however, is insulated from the surfaces of the wafer by the region 31 of the oxide layer 19 which completely covers the collector junction 15 and the entire collector surface area common to the two transistors.

External circuit connection may be made to the base ohmic contact by compression bonding lead 32 to base tab 26. It should be noted that lead 32 can be placed anywhere on tab 26 without adversely affecting the symmetry of the base current feed to the two transistors inasmuch as the base current must flow through the narrow or necked portion of the base tab to reach the central portion 25 of the base contact 24. Base tab 26 is widened at one end to present a larger "target" area to the assembler who must position lead 32 using micromanipulators and a microscope. It can be seen that the symmetry of the base current feed is determined primarily by the high precision of conventional masking techniques which precisely shape and locate the base ohmic contact

24, central member 25 and tab 26. In the absence of the base tab configuration, great skill would be demanded of the assembler in symmetrically locating lead 32 relative to the two transistors. A feature of the closed form of the base contact 24 is that should there be some misalignment of the masks which are used in the successive etching and diffusion operations to form the collector and emitter junctions, the resulting asymmetry is identically the same in the two transistors. Substantially identical asymmetry preserve a zero net off-set potential acting between terminals 3 and 4. This follows from the fact that although the individual off-set potentials of the transistors change due to the asymmetry of the emitter junctions relative to the collector junction, the changes cancel each other due to the opposing connection of the two transistors as shown in FIG. 1.

From the preceding specification, it will be seen that the objects of the present invention have been achieved through the use of a special base ohmic contact and tab in a microelectronic chopper circuit. Conventional fabrication techniques may be employed in the production of the entire microelectronic device including the base contact and tab. Briefly, the device may be formed by the repetitive use of a standard procedure comprising the operations discussed next. The silicon wafer is oxidized with oxygen or steam and the resulting oxidized layer is covered with photo-resist. The photo-resist is exposed through the appropriate mask. When the photo-resist is developed, the developer removes the photo-resist in areas which had not been exposed. The residual exposed photo-resist is then hardened to withstand the subsequent acid etch treatment. The etch removes the oxide layer in the areas unprotected by photo-resist. The remaining oxide provides a mask against the diffusion of impurities into the silicon wafer. Then, the exposed areas of the silicon wafer are diffused with an impurity to produce the transistor base regions. Upon the completion of the base region diffusion, new oxide is grown over the surface of the wafer and the above-described steps are repeated for the formation of the two emitter regions within the common base region. Finally, after the emitter regions have been produced, the oxide layer is reformed to expose areas of the wafer in the shape of the base and emitter ohmic contacts. Then, aluminum is deposited to produce the base and emitter ohmic contacts.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. A microelectronic device comprising
   a pair of transistors formed on a single wafer of semiconductive material, each of said transistors having a base and two additional electrodes,
   the bases of said transistors being connected together through said wafer,
   one of said additional electrodes of one of said transistors being connected through said wafer to the electrode of the other of said transistors corresponding to said one electrode,
   the other of said additional electrodes of one of said transistors and the electrode of the other of said transistors corresponding thereto being formed on the same surface of said wafer within an area which is common to said bases of both transistors,
   a base ohmic contact on said area completely surrounding the other electrode and said electrode corresponding thereto,
   said contact having a central portion passing between said other electrode and said electrode corresponding thereto, and
   a tab connected to said central portion of said contact, said tab being isolated from said wafer by a layer of insulating material, one end of said tab being relatively narrow with respect to the other end thereof, said relatively narrow end being connected to said central portion of said contact.

2. A microelectronic device comprising a pair of transistors formed on a single wafer of semiconductive material, each of said transistors having a base, emitter and collector electrodes, the bases of said transistors being connected together through said wafer, the collectors of said transistors being connected together through said wafer, the emitters of said transistors being formed on the same surface of said wafer within an area which is common to said bases of both transistors, a base ohmic contact on said area completely surrounding said emitters, said contact having a central portion passing between said emitters, and a tab connected to said central portion of said contact, said tab being isolated from said wafer by a layer of insulating material, one end of said tab being relatively narrow with respect to the other end thereof, said relatively narrow end being connected to said central portion of said contact.

3. A microelectronic chopper circuit comprising a pair of planar transistors formed on a single wafer of semiconductive material, each of said transistors having a base, emitter and collector electrodes, the bases of said transistors being connected together through said wafer, the collectors of said transistors being connected together through said wafer, the emitters of said transistors being formed on the same surface of said wafer within an area which is common to said bases of both transistors, said emitters constituting the output terminals of said chopper circuit, a base ohmic contact on said area completely surrounding said emitters, said contact having a central portion passing between said emitters, and a tab connected to said central portion of said contact, said tab being isolated from said wafer by a layer of insulating material, one end of said tab being relatively narrow with respect to the other end thereof, said relatively narrow end being connected to said central portion of said contact.

4. A microelectronic device comprising a pair of transistors formed on a single wafer of semiconductive material, each of said transistors having a base and two additional electrodes, the bases of said transistors being connected together through said wafer, one of said additional electrodes of one of said transistors being connected through said wafer to the electrode of the other of said transistors corresponding to said one electrode, the other of said additional electrodes of one of said transistors and the electrode of the other of said transistors corresponding thereto being formed on the same surface of said wafer within an area which is common to said bases of both transistors, a base ohmic contact on said area completely surrounding the other electrode and said electrode corresponding thereto, said contact having a central portion passing between said other electrode and said electrode corresponding thereto, and a tab connected to said central portion of said contact, said tab being isolated from said wafer by a layer of insulating material, one portion of said tab being relatively narrow with respect to another portion thereof, and said relatively narrow portion being connected to said central portion of said contact.

5. A microelectronic chopper circuit comprising a pair of planar transistors formed on a single wafer of semiconductive material, each of said transistors having a base, emitter and collector electrodes, the bases of said transistors being connected together through said wafer, the collectors of said transistors being connected together through said wafer, the emitters of said transistors being formed on the same surface of said wafer within an area which is common to said bases of both transistors, said emitters constituting the output terminals of said chopper circuit, a base ohmic contact on said area completely surrounding said emitters, said contact having a central portion passing between said emitters, and a tab connected to said central portion of said contact, said tab being isolated from said wafer by a layer of insulating material, one portion of said tab being relatively narrow with respect to another portion thereof, and said relatively narrow portion being connected to said central portion of said contact.

References Cited by the Examiner

UNITED STATES PATENTS

| | | | |
|---|---|---|---|
| 2,981,877 | 4/1961 | Noyce | 217—235 |
| 2,999,195 | 9/1961 | Saby | 317—235 |
| 3,013,192 | 12/1961 | Starr | 317—235 |

FOREIGN PATENTS

| | | |
|---|---|---|
| 644,830 | 7/1962 | Canada. |

JOHN W. HUCKERT, *Primary Examiner.*

R. SANDLER, *Assistant Examiner.*